Figure 1:
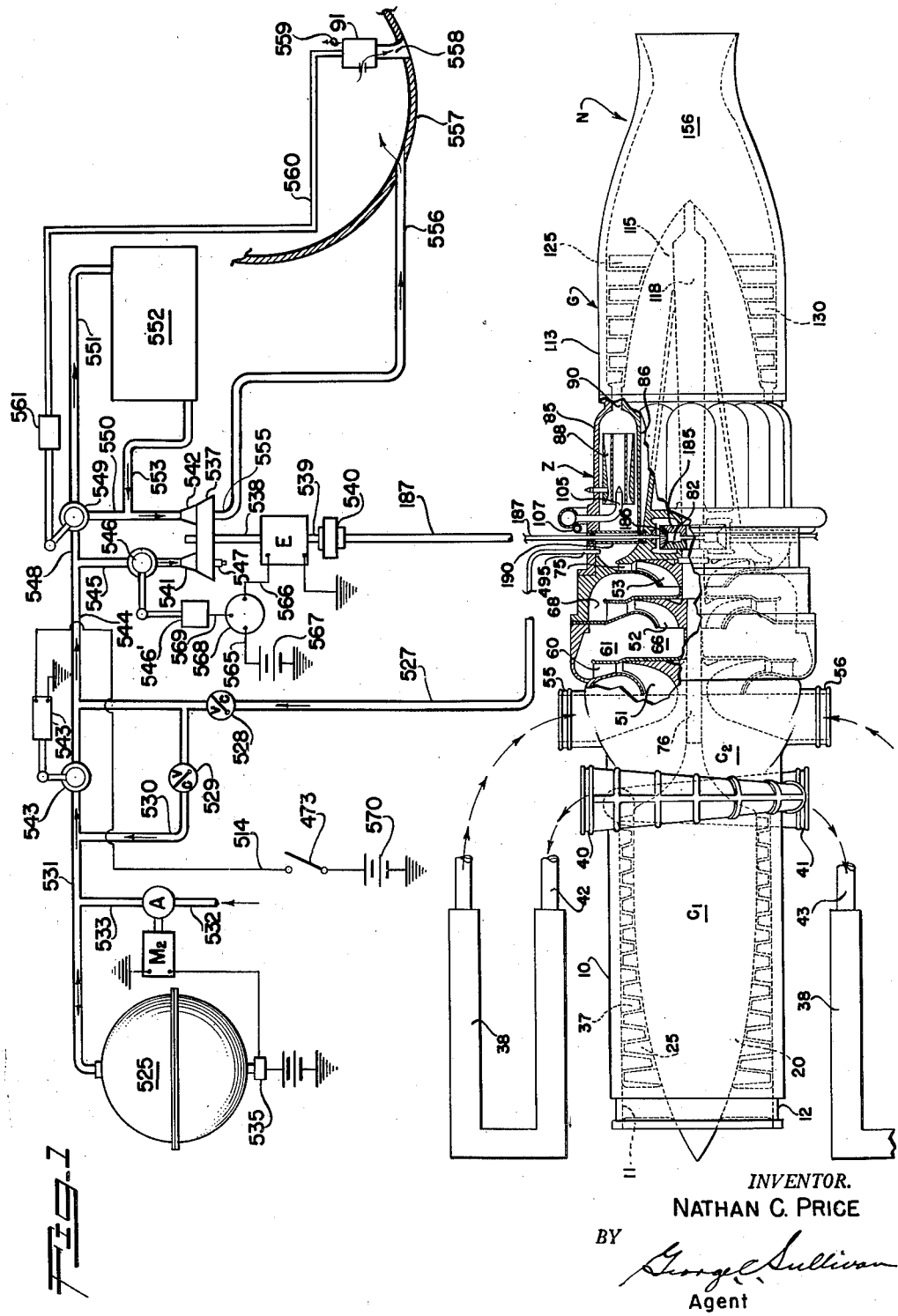

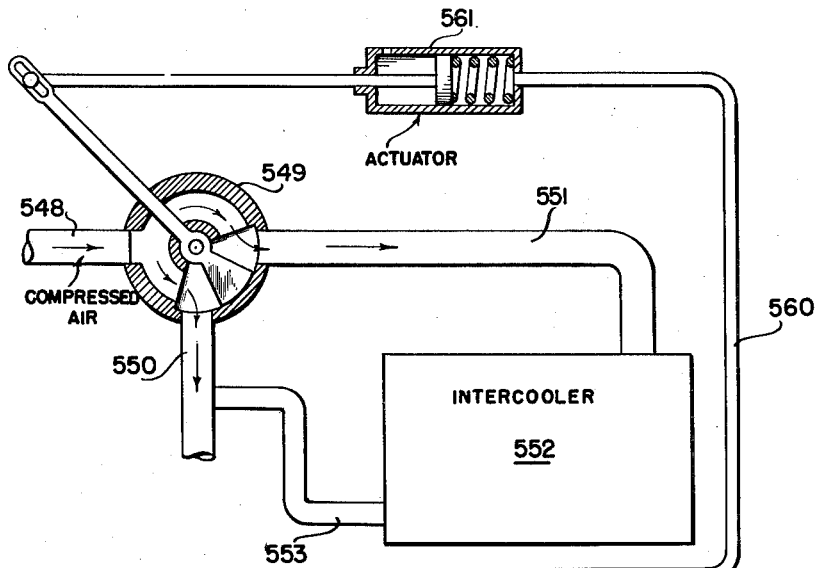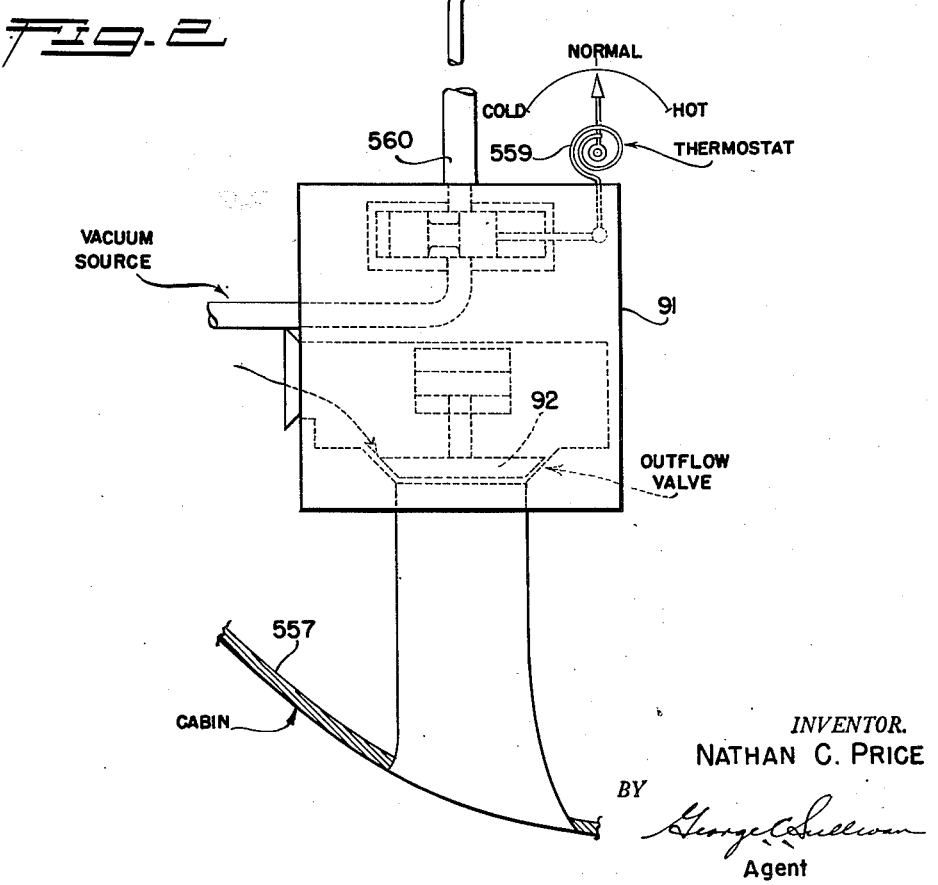
Fig. 2

Patented Jan. 15, 1952

2,582,848

UNITED STATES PATENT OFFICE 2,582,848

AIRCRAFT POWER PLANT AND CABIN PRESSURIZING SYSTEM

Nathan C. Price, Los Angeles, Calif., assignor to Lockheed Aircraft Corporation, Burbank, Calif.

Original application March 6, 1942, Serial No. 433,599. Divided and this application February 2, 1945, Serial No. 575,913

9 Claims. (Cl. 244—59)

This invention relates to the propulsion of aircraft, and the pressurizing or air conditioning of aircraft cabins. It is a general object of the invention to provide a practical efficient internal combustion reaction type power plant system for the propulsion of aircraft embodying means for controlling cabin pressure and temperature.

This application is a division of application, Serial Number 433,599, filed March 6, 1942, and entitled "Gas Reaction Aircraft Powerplant," which issued as Patent No. 2,540,991.

In aircraft intended to be operated at high altitudes it is desirable, if not mandatory, to maintain the pressure in the passenger and operator's compartments at, or above, a fixed minimum value. Aircraft propelled by gas reaction or jet propulsion power plants operate at augmented efficiency at altitudes in excess of those practical with aircraft driven by conventional propeller apparatus and cabin pressurizing equipment is essential in such high altitude aircraft. The cabin pressurizing apparatus employed in aircraft propelled by conventional power plants and propeller apparatus, are not altogether suited for use in aircraft embodying gas reaction propulsive means and are not designed to be coordinated with this type of propulsion system.

It is, therefore, an object of this invention to provide an aircraft power plant unit of the internal combustion reaction type incorporating cabin pressurizing apparatus advantageously associated with the primary power plant elements. The cabin pressurizing apparatus is supplied with air under pressure by one stage of the air compressor system embodied in the power plant and the air thus supplied is utilized to drive the turbine-generator combination of the power plant prior to its introduction into the cabin. Thus a portion of the compressed air from the power plant is utilized to generate electrical current and then maintain a selected atmosphere or pressure in the cabin of the airplane.

It is another object of the invention to provide an aircraft power plant of the internal combustion reaction type characterized by a system or combination of elements which has the multiple function of starting the power plant, of generating electrical current for auxiliary electrical equipment and of pressurizing or air conditioning the aircraft cabin.

It is another object of the invention to provide a power plant system of the character referred to in which the air turbine for driving the generator, which supplies current to the auxiliary equipment during flight, serves to drive the gas turbine shaft and blower shaft of the primary power plant for the starting of the power plant. In accordance with the invention, the air turbine and a portion of the piping system thereof, are employed to bring the compressor-turbo means of the power plant up to starting speed and subsequently during flight, serve to drive the electrical generator.

Another object of the invention is to provide a power plant combination of the character mentioned embodying an intercooler connected in an alternative air supply line of the air turbine, and thermostatic means sensitive to cabin temperatures and operable to govern the flow through the primary and alternative air supply lines of the turbine to control the temperature of the air being supplied to the cabin. Air supplied through the primary line is warm when it leaves the turbine for passage to the cabin, even after its expansion in the air turbine, while the air that is supplied to the turbine after passage through the intercooler is cool after its expansion in the turbine. The thermostatic device is operable to proportion the quantities of cooled and uncooled air that reach the cabin and thereby maintain the preferred temperature in the cabin.

Briefly, the invention is embodied in power plant apparatus having means to compress air in several stages by the combined effect of impact or ramming produced by the high velocity of the unit relative to the ambient air and by the action of multiple stage power driven compressor units of high efficiency, the introduction and constant combustion fuel in the air thus compressed to form high temperature, high volume gaseous products of combustion and utilizing the expansion and reaction of the gases to drive the compressors and to supply reactive propulsive force to the unit, all acting in conjunction with air pressure storage means, power plant starting means and cabin pressurizing means.

Other objects and features of the invention will become apparent from the following detailed description of a typical preferred form of the invention in which:

Figure 1 is a flow diagram or diagrammatic view of apparatus of the invention with a portion of the associated power plant appearing in cross section, and Figure 2 is an enlarged diagrammatic view of a portion of the system or apparatus.

Referring to the drawings in which like reference numerals refer to corresponding parts throughout the several figures, the apparatus of the invention is as follows:

The power plant, operating at high altitude in air of extremely low density, must necessarily handle a great volumetric air flow. It is thereby essential that the inlet of the blower system of the power plant be made unusually large and that it have a very high compression efficiency at the same time. Therefore, at the leading end of the jet power plant as shown in Figure 1, a cylindrical housing 10 is provided for the multi-stage axial blower $C_1$ which constitutes the first stage air compressor. The housing 10 is provided at the forward end with an annular opening 11 defined by a grooved spigot 12, both of which are of substantially full axial blower diameter and to which a forwardly directed conical ram (not shown) may be attached to extend out of the leading end of the fuselage or the leading edge of the wing according to the type of installation whereby intake air may be caught and initially compressed in the ram by impact effected by the high velocity of the air relative to the aircraft under flight prior to its entrance into the beforementioned axial blower.

The rotor shell 20 of the axial blower $C_1$ has a form which may be defined approximately as a truncated, prolate spheroid, and carries a plurality of rows of impeller blades 25 which operate between rows of stationary diffuser vanes 37 on the inside of the housing 10.

The inner exhaust end of the axial blower terminates in a split, double scroll outlet housing having a pair of outlet spigots 40 and 41 which lead through suitable couplings 42—43 to suitable intercoolers 38 which may be arranged in the airplane wings or at other locations in the airplane.

Located in the intermediate portion of the power plant and immediately to the rear of the axial blower transmission is the second stage air compressor unit $C_2$ which is preferably of a high speed multi-stage radial flow or centrifugal blower type. This centrifugal blower comprises three additional stages of centrifugal compression 51, 52 and 53 in tandem arrangement. This type of compressor lends itself to diametrally compact and short coupled construction and is adapted to high efficiency operation upon the dense air fed from the first stage compressor after passing through the wing surface cooler.

A pair of inlet nozzle connections 55 and 56 serve to receive the first stage compressed air from the beforementioned wing intercoolers and to introduce it to the inlet of the first centrifugal blower stage 51. A plurality of stationary diffuser vanes 60 receive the compressed air from the stage 51, and the annular chamber 61 serves to direct the flow of air therefrom to the inlet 66 of the second centrifugal blower 52 and the annular shaped chamber 68 formed in the body of the unit in turn serves to direct compressed air leaving the blower 52 to the inlet of the third and final centrifugal compressor 53. Air from the final stage compressor 53 passes through stationary diffuser vanes 75 to the entrance of the combustion chamber Z.

The impellers of the three centrifugal blowers 51, 52 and 53 are fixed to a common shaft 76 which is rotatably journaled coaxially within the body of the centrifugal blower portion of the power unit. The forward extension of the centrifugal blower shaft 76 couples to the axial blower 10. The rear end of the shaft 76 carries a bevel gear 82 which constitutes a portion of the counter-rotation transmission through which it is driven by the gas turbine G, also as more fully described hereinafter.

The beforementioned combustion chamber Z into which the final stage compressor discharges, is an approximately annular space defined on the outside by the housing 85 and on the inside by a shroud 86, both preferably fabricated from a heat resistant alloy such as nickel-chromium-iron. The said outside housing 85 and inner shroud 86 are formed to house the plurality of cylindrical burner tubes 88. The substantially annular combustion chamber Z converges at the rear end to an annular nozzle ring 90 of reduced cross-sectional area. The combustion chamber nozzle ring 90 serves to hold a back pressure upon the combustion chamber and to efficiently discharge hot gases at high velocity from the combustion chamber into the expansion zone of the gas turbine G.

Fuel spray nozzles 105 extend concentrically for a short distance into the forward ends of each of the before described burner tubes 88. The spray nozzles communicate with and are supported by fuel and air injection tubes 107 which are connected with tube 110 which makes external connection through a manifold 112 suitable fuel and compressed air supply pumps and regulators (not shown).

The gas turbine G which is contained within a cylindrical housing 113 comprises a tapered rotor 115 having the approximate shape of a portion of an extremely prolate spheroid and being coaxially positioned within the power plant with the end of minimum diameter facing rearwardly in the direction of flow of the propellant gases. The rotor 115 is secured to the rear end of a hollow, tapered shaft 118 which is in turn rotatably supported concentrically within the power unit.

The gas turbine rotor 115 is provided with a plurality of rows of impeller blades or buckets 125, which may be constructed from heat resistant, high strength alloy such as nickel-chromium-iron.

The plurality of gas turbine stator blades as shown at 130 and which extend radially inward intermediate the before described rows of impeller blades are attached to the interior surface of the cylindrically shaped turbine housing 113.

Immediately to the rear of the gas turbine G is the nozzle N which comprises an approximately Venturi shaped housing 156 carrying a refractory lining which may be carborundum or like material.

The forward end of the hollow gas turbine shaft 118 carries a bevel gear 185 which meshes with a plurality of bevel pinions 186, each splined to the inner end of a radially positioned auxiliary drive shaft 187. The auxiliary pinion drive shafts are arranged to pass radially through the forward portion of the combustion chamber through tubular housings 190 and out of the combustion chamber housing.

Fixed to the rear end of the radial blower shaft 76 and adjacent the bearing 78 is the bevel gear 82 which also meshes with the beforementioned bevel pinions 186. Shafts 76 and 118 are thus adapted for counter-rotation with respect to one another, through the action of the transmission comprising bevel gears 185 and 82 and bevel pinions 186.

The cabin pressure and temperature control system of this invention includes a flask 525 for storing or containing air under pressure. As illustrated in the drawing the flask is spherical in shape. In accordance with the invention, the flask 525 is connected with the final stage air compressor 53 of the power plant to receive air under pressure therefrom so that a supply of air may be stored at approximately 250 pounds per square inch during power plant operation. A pipe 527 leads from a nipple 495 at the discharge of the final stage air compressor 53. A branch 530 is provided for the line 527 and the pipe 530 and its branch join a pipe 531 which leads to the flask 525. Suitable check valves 528 and 529 are connected in the pipes 527 and 530, respectively, to prevent reverse flow from the flask. A compressor A is connected into the pipe 531 by a pipe 533 and is driven by an electric motor M₂. The compressor A is operable to receive atmospheric air from the intake 532 and compress it to a pressure of approximately 300 pounds per square inch for delivery to the flask 525. This provides for standby service and initial starting of the power plant. The means for controlling the motor M₂ comprises a pressure actuated switching device 535 associated with the storage flask 525. When pressure in the flask 525 drops below a given value, the pressure sensitive device 535 closes the energizing circuit of the motor M₂. With sufficient pressure in the flask the device 535 opens the motor circuit to deenergize the motor and thus terminate compressor operation.

An auxiliary drive shaft 187 of the power plant extends radially from the differential transmission of the power plant and is utilized to start power plant operation as will be later described. An overrunning clutch 540 is connected between the shaft 187 and the shaft 539 of the generator E. The invention provides a high-speed turbine wheel 537 for driving the generator E. In the diagram the turbine wheel is connected with an extension 538 of the generator shaft.

The turbine wheel 537 is adapted to receive actuating compressed air through two nozzles 541 and 542. A pipe 544 extends from the pipe 531 and has a branch 545 leading to the nozzle 541 so that compressed air may be supplied to the nozzle from the supply flask 525. An electric starter valve 543 is connected in the pipe 544 at a point between the junctions of the pipes 527 and 530 with the pipe 544. The actuator 543′ for the valve 543 may be energized by closing a starting switch 473 in a starting circuit 514. A suitable nozzle control valve 546 is connected in branch pipe 545. An exhaust pipe 547 is provided for the turbine 537 opposite the nozzle 541. A branch pipe 548 extends from the pipe 544 to a two-way cock 549. A pipe 550 leads from the cock 549 to the turbine nozzle 542 so that when the cock 549 is in one of its positions compressed air may be supplied directly to the nozzle. A second pipe 551 extends from the two-way cock 549 to an intercooler 552 and a line 553 leads from the intercooler to the nozzle pipe 550 so that when the two-way cock is in its other position, compressed air flows through the intercooler before reaching the nozzle. Provision is made whereby the exhaust from the turbine 537, of the air supplied to pipe 550, is delivered to a cabin enclosure or other compartment of the airplane. In the diagram 557 indicates the cabin enclosure and a pipe 556 is provided to carry said exhaust air to the enclosure.

The invention provides a thermostatic control for the two-way cock whereby air may be supplied to the cabin enclosure 557 either from the pipe 550 or the pipe 551, or airflow may be divided between said sources in accordance with the temperature conditions in the cabin enclosure. The thermostat control is such that the two-way cock 549 is at all times open either to both of the pipes 550 and 551 or to one or the other of the pipes 550 and 551 so that the air under pressure is at all times supplied to the enclosure. The control system may be of the kind disclosed in my earlier Patent No. 2,405,670, granted August 13, 1946, and includes an outflow valve pack or unit 91 having a thermostat 559 or equivalent temperature responsive device sensitive to the temperature within the enclosure 557. An actuating device 561 is operatively connected with the two-way cock 549 to operate the same and a suitable interconnection 560, say a vacuum or pneumatic operating interconnection, is provided between the temperature responsive device 559 and the actuating device 561 so that the position of the two-way cock 549 is determined by the temperature conditions in the enclosure 557. The outflow unit 91 includes a valve 92 for controlling the discharge of air from the enclosure 557. Figure 2 illustrates the operative relationship between the two-way cock 549 and the temperature responsive means 559 of the outflow valve unit 91. The intercooler 552 is preferably of the skin surface type and may be located in any suitable position in the fuselage or wing structure of the airplane where effective heat exchange with the airstream may be effected.

The generator E is operable to supply charging current to a bank of storage batteries 567 through suitable conductors 565 and 566. Means is provided to actuate the nozzle control valve 546 to increase or decrease the air under pressure being supplied to the turbine 537 in accordance with the battery charging and electrical accessory current requirements. A differential voltage sensitive switch 568 is connected with the nozzle control valve 546 through the medium of a suitable coupling 569 and a valve actuating solenoid 546′ to effect this actuation of the nozzle control valve.

The differential voltage sensitive switch 568 is of a conventional voltage operated type and is constructed and arranged to energize the electromagnetically actuated means 546′ to open the throttle valve 546 when the voltage of the battery circuit drops below a predetermined value and to close the throttle valve 546 when the voltage of the battery circuit rises above a predetermined value. In practice the battery circuit has a maximum potential of, say, 24 volts when the power plant is idle, whereas the generator E has a charging potential somewhat greater, say, 28 volts. Thus the switch 568 does not cause closing of the valve 546 when the plant is idle and is closed only during operation of the generator E when the potential is above normal battery potential.

In starting the power plant the starter switch 473 is closed to complete the electrical circuit from the battery 570 through the conductor 514, the solenoid 543′ of the starter air valve 543 and return through the ground connections. This completion of the starter circuit results in opening the valve 543 and admitting air from the pressure flask 525 through lines 544, 545, and regulating valve 546 to the nozzle 541 of the air starter turbine wheel 537. This turbine wheel, which is designed particularly for starting with a relatively small flow of air may be relatively small in size; for example, it may be six inches in diameter and capable of delivering about 30

B. H. P. The resultant torque from the turbine wheel 537 is transmitted through the overrunning clutch 540 and shaft 187 to the intermediate pinion 186 as shown in Figure 1, which meshes with gears 185 and 82 and drives the gas turbine shaft 118 and the blower shaft 76 in counter-rotation with respect to one another. As soon as the turbine and the blowers are up to about 15 per cent of normal speed, sufficient air will be self supplied by the blower and the compressor of the unit to the combustion chamber to establish flow and pressure conditions in the power plant suitable for the combustion of fuel in the combustion chamber Z and the operation of the turbine G by the resultant gases to make the power plant self-motoring.

The power plant may become self-motoring at approximately 15 per cent of rated speed and a smaller amount of starting air is required than if air were released from the tank directly to the inlet of the gas turbine, the flow passages of which are obviously disproportionately large for starting purposes. At idling speed the overrunning clutch 540 disengages the shaft 187 from the starter turbine 537 and the generator E, preventing them from being driven at excessive speeds by the power unit.

When the power unit is in normal operation the overriding clutch 540 acts to keep the generator drive shaft 538 disengaged from the accessory drive shaft 187 through which the unit is started as before described. Thus during normal operation the generator E is driven solely from the air turbine 537 by air fed through either one or both of the nozzles 541 or 542. Ordinarily the air throttle 546 is actuated by means of the voltage sensitive device 560 in such manner as to supply just sufficient air to primary nozzle 541 to meet the power requirement for current demanded for charging the batteries and for the various electrical facilities within the aircraft.

As above described, compressed air from the discharge of the second stage compressor of the power plant is employed to air condition and pressurize the airplane cabin 557. This air is supplied to the cabin through pipe 556 which leads from the exhaust 555 of the air turbine nozzle 542, which in turn, receives the compressed air through pipe 550, the two-way cock 549, and the pipes 544 and 527. The temperature of the air in the cabin 557 influences the thermostat device 559 to determine the setting or position of the two-way valve 549. The setting of the valve 549 in turn determines whether the compressed air is fed to the secondary nozzle 542 directly through the pipe 550 or through the intercooler 552 and pipe 553. In either case, however, the turbine as the result of the work performed in driving the generator E reduces the temperature of the exhaust air to a greater extent than is obtainable with the Joule-Thomson effect at a given pressure ratio, the Joule-Thomson effect being a well-known phenomenon and being defined on page 469 of Chambers' Technical Dictionary, Revised Edition, published in 1944 by the Macmillan Company as "The slight fall in temperature which occurs when a gas is allowed to expand without doing external work. The effect is due to energy absorbed in overcoming the cohesion of the molecules of the gas." Accordingly, the thermostat device 559 controlling the two-way valve through the medium of the electrical adjusting or operating means 561, determines the temperature of the air being supplied to the cabin.

I claim:

1. In combination with an aircraft having a pressure cabin, a cabin air supply means comprising an air compressor for producing a substantially greater air pressure than sea level altitude pressure when the aircraft is flying at high altitudes, an intercooler and an air turbine, means for loading said air turbine, bypass means for passing compressed air from said compressor through said cooler to said turbine, means for passing compressed air from said compressor directly to said turbine, said turbine operating to reduce the temperature of said air to an extent greater than is obtainable with the Joule-Thomson effect at a given pressure ratio, and means to selectively adjust the proportion of air passed directly to said turbine and through said bypass means, an exhaust for said air from said turbine, and means to transfer said exhaust air under pressure from said turbine to said pressure cabin.

2. Apparatus according to claim 1 in which said means to selectively adjust the proportions of air passed directly to said turbine and through said bypass includes means responsive to temperature changes in said pressure cabin and operable to tend to maintain a constant cabin air temperature.

3. In an aircraft having a cabin enclosure and an internal combustion reaction type power plant for propelling the aircraft, the power plant including at least one air compressor, a gas turbine and a combustion chamber between the gas turbine and combustion chamber, the combination of an air turbine in driving relation to the compressor and gas turbine for starting the power plant, means for storing compressed air to drive the air turbine for the purpose of starting the power plant, a load for the air turbine during operation of the power plant, means for conducting compressed air from the compressor to the air turbine to drive the same during power plant operation, and means for conducting the exhaust air from the air turbine and discharging it into said enclosure to air-condition the same, said air turbine serving to reduce the temperature of the air to an extent greater than is obtainable with the Joule-Thomson effect at a given pressure ratio.

4. In an aircraft having a cabin enclosure and an internal combustion reaction type power plant for propelling the aircraft, including at least one air compressor, a gas turbine and a combustion chamber between the gas turbine and combustion chamber, the combination of an air turbine in driving relation to the compressor and gas turbine for starting the power plant, means for storing compressed air to drive the air turbine for the purpose of starting the power plant, a load for the air turbine during operation of the power plant, means for conducting compressed air from the compressor to the air turbine to drive the same during power plant operation, an overrunning clutch between the air turbine and the compressor and gas turbine whereby the power plant does not drive the air turbine during power plant operation, and means for conducting the exhaust air from the air turbine and discharging it into said enclosure to air-condition the same, said air turbine serving to reduce the temperature of the air to an extent greater than is obtainable with the Joule-Thomson effect at a given pressure ratio.

5. In an aircraft having a cabin enclosure and an internal combustion reaction type power plant for propelling the aircraft, the power plant including at least one air compressor, a gas turbine and a combustion chamber between the gas turbine and combustion chamber, the combination of an air turbine in driving relation to the compressor and gas turbine for starting the power plant, means for storing compressed air to drive the air turbine for the purpose of starting the power plant, a starter valve between the storage means and the air turbine, a load for the air turbine during operation of the power plant, means for conducting compressed air from the compressor to the air turbine to drive the same during power plant operation, and means for conducting the exhaust air from the air turbine and discharging it into said enclosure to air-condition the same, said air turbine serving to reduce the temperature of the air to an extent greater than is obtainable with the Joule-Thomson effect at a given pressure ratio.

6. In an aircraft having a cabin enclosure and an internal combustion reaction type power plant for propelling the aircraft, the power plant including at least one air compressor, a gas turbine and a combustion chamber between the gas turbine and combustion chamber, the combination of an air turbine in driving relation to the compressor and gas turbine for starting the power plant, means for storing compressed air to drive the air turbine for the purpose of starting the power plant, means for conducting compressed air from the compressor to the storage means, a load for the air turbine during operation of the power plant, means for conducting compressed air from the compressor to the air turbine to drive the same during power plant operation, and means for conducting the exhaust air from the air turbine and discharging it into said enclosure to air-condition the same, said air turbine serving to reduce the temperature of the air to an extent greater than is obtainable with the Joule-Thomson effect at a given pressure ratio.

7. In an aircraft having a cabin enclosure and an internal combustion reaction type power plant for propelling the aircraft, the power plant including at least one air compressor, a gas turbine and a combustion chamber between the gas turbine and combustion chamber, the combination of an air turbine in driving relation to the compressor and gas turbine for starting the power plant, means for storing compressed air to drive the air turbine for the purpose of starting the power plant, a generator driven by the air turbine during operation of the power plant, means for conducting compressed air from the compressor to the air turbine to drive the same during power plant operation, and means for conducting exhaust air from the air turbine and discharging it into said enclosure to air-condition the same, said air turbine serving to reduce the temperature of the air to an extent greater than is obtainable with the Joule-Thomson effect at a given pressure ratio.

8. In an aircraft having a cabin enclosure and an internal combustion reaction type power plant for propelling the aircraft, the power plant including at least one air compressor, a gas turbine and a combustion chamber between the gas turbine and combustion chamber, the combination of an air turbine in driving relation to the compressor and gas turbine for starting the power plant, means for storing compressed air to drive the air turbine for the purpose of starting the power plant, a generator driven by the air turbine during operation of the power plant, means for conducting compressed air from the compressor to the air turbine to drive the same during power plant operation and to be cooled by expansion in the air turbine, including two conductors, a valve controlling one of said conductors, a load for the generator, differential voltage sensitive means associated with said load and adapted to operate said valve, said air turbine serving to reduce the temperature of the air to an extent greater than is obtainable with the Joule-Thomson effect at a given pressure ratio and means for receiving the cool air exhausted from the air turbine and conducting it to the enclosure for discharge therein.

9. In an airplane having an enclosure, an internal combustion reaction type power plant for propelling the airplane and including a compressor, an auxiliary air turbine for producing power and having two through-flow air ducts for receiving air under pressure from said compressor, the discharge side of one of said ducts discharging into the enclosure, a load consumer for the air turbine in the form of an electric generator, the air turbine operating to reduce the temperature of the air which drives the same to an extent greater than that obtainable by the Joule-Thomson effect at a comparable pressure ratio, and a voltage responsive device associated with the circuit of the generator for regulating the air flow through the other of said air ducts.

NATHAN C. PRICE.

REFERENCES CITED

The following references are of record in the file of this patent:

UNITED STATES PATENTS

| Number | Name | Date |
|---|---|---|
| 1,779,160 | Diehl | Oct. 21, 1930 |
| 1,781,062 | Houston | Nov. 11, 1930 |
| 1,788,673 | Houston | Jan. 13, 1931 |
| 2,063,477 | Young et al. | Dec. 8, 1936 |
| 2,085,761 | Lysholm | July 6, 1937 |
| 2,191,289 | Price | Feb. 20, 1940 |
| 2,233,031 | Price | Feb. 25, 1941 |
| 2,309,064 | Gregg et al. | Jan. 19, 1943 |
| 2,328,489 | Pfau | Aug. 31, 1943 |

FOREIGN PATENTS

| Number | Country | Date |
|---|---|---|
| 526,104 | Great Britain | Sept. 11, 1940 |